United States Patent [19]

Rauscher

[11] 4,032,384

[45] June 28, 1977

[54] METHOD OF MAKING A CONVEYOR BELT

[75] Inventor: David A. Rauscher, Columbia, S.C.

[73] Assignee: Cable Conveyor Systems, Inc., Columbia, S.C.

[22] Filed: Jan. 8, 1976

[21] Appl. No.: 647,312

[52] U.S. Cl. .................. 156/137; 24/38; 74/237; 156/157; 156/158

[51] Int. Cl.² .................. B29H 7/22; F16G 3/10; G03D 15/04

[58] Field of Search ......... 156/137, 157, 158, 159, 156/160, 304, 494, 495, 502, 505, 507, 508, 509, 544; 24/38; 74/237

[56] References Cited

UNITED STATES PATENTS

| | | | |
|---|---|---|---|
| 2,566,262 | 8/1951 | Traxler | 74/237 |
| 3,556,892 | 1/1971 | Hilliard | 156/137 |
| 3,684,606 | 8/1972 | Grainger | 156/137 |
| 3,719,969 | 3/1973 | McGinnis | 24/38 |
| 3,779,845 | 12/1973 | Hutz et al. | 156/137 |
| 3,793,118 | 2/1974 | Gilles et al. | 156/137 |

*Primary Examiner*—Caleb Weston
*Attorney, Agent, or Firm*—Mason, Fenwick & Lawrence

[57] ABSTRACT

A conveyor belt is fabricated by unrolling first and second webs of uncured rubber between which plastic-jacketed reinforcing cable tendons are fed to provide an uncured sandwich array which is then fed into a vulcanizing unit which is then operated to provide a cured belt section. The steps are successively repeated with mechanical cable tenden splices being made during the vulcanizing operation with the different splice junctions of each cable tendon being spaced a maximum distance from the next adjacent splice junction of another cable tendon along the entire length of the belt member being formed.

11 Claims, 5 Drawing Figures

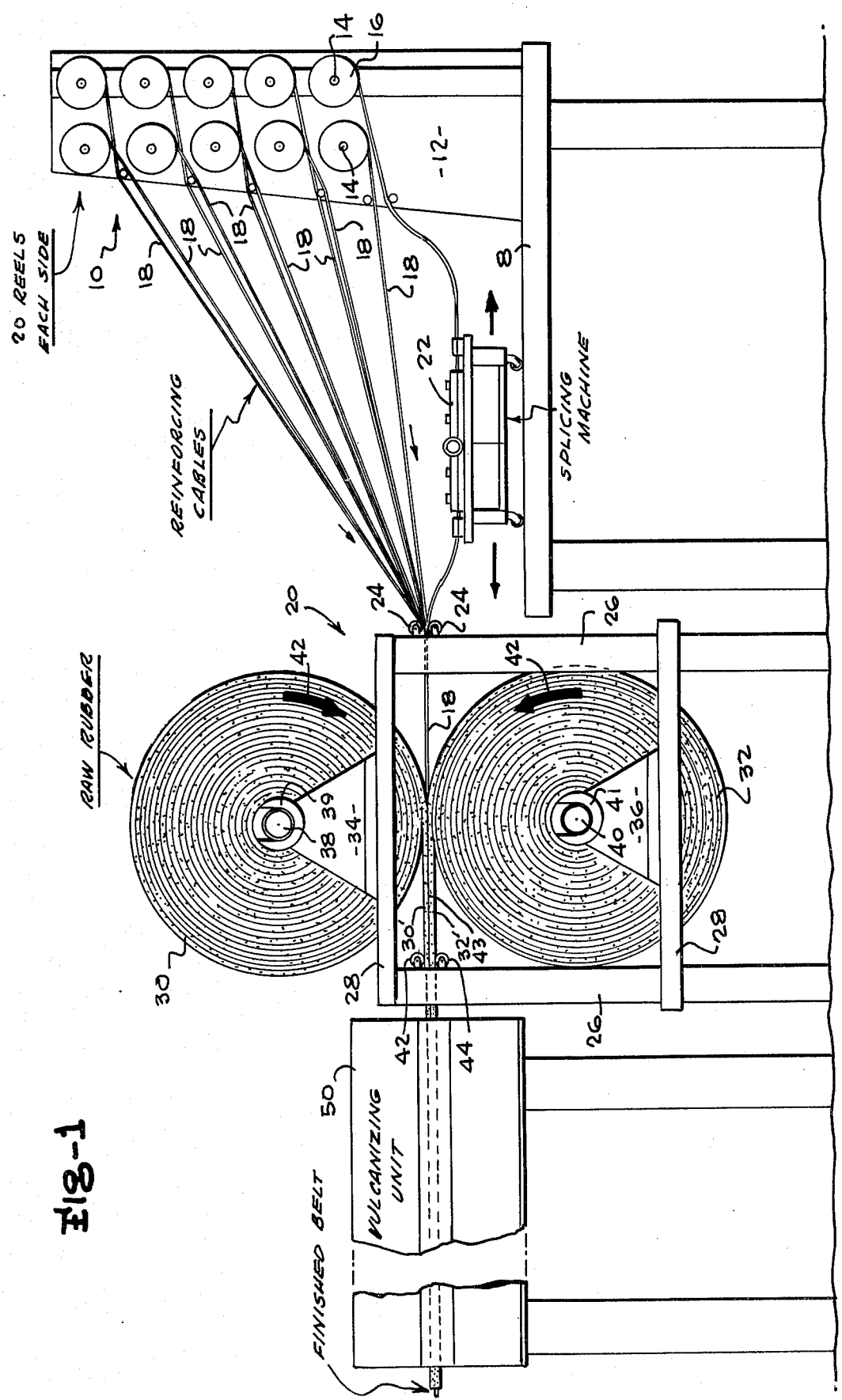

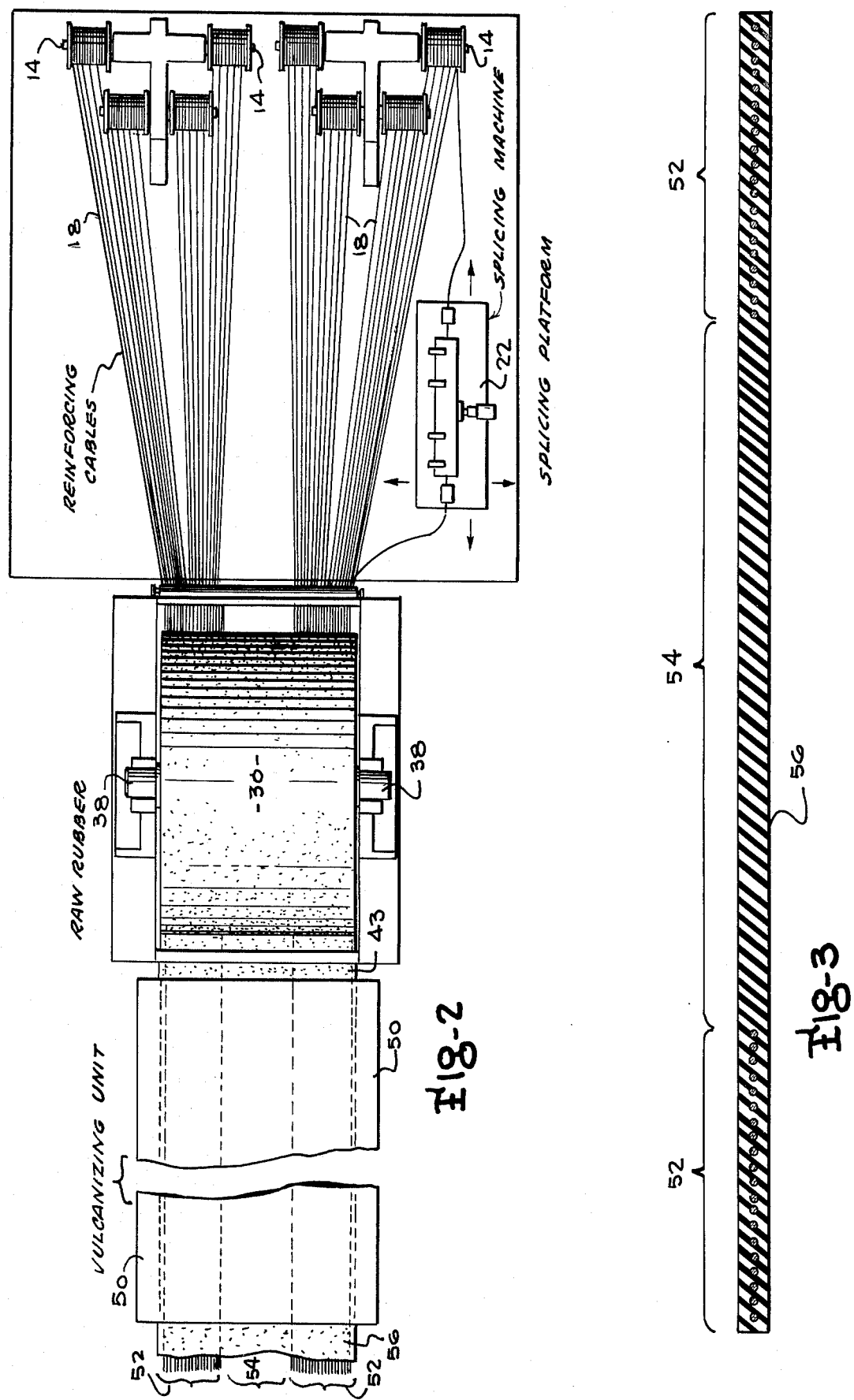

METHOD OF MAKING A CONVEYOR BELT

This invention is in the field of material handling equipment and is specifically directed to the field of conveyor belt constructions and methods of fabricating conveyor belts formed of rubber-like material in which longitudinally extending reinforcing tendon members such as wire cable are provided.

Heavy duty conveyor belts such as are used in mines, quarries and the like are usually formed of rubber or similar material (hereinafter referred to as "rubber-like material") with the rubber-like material being provided with embedded reinforcing members in the form of steel cables or wires for achieving the necessary strength for the particular usage to which the belts are to be employed. It has been conventional practice for many years to embed such cables in the rubber-like body of the belt during the fabrication of the belt member.

Prior known conveyor belts of the aforementioned type can be several thousand feet in length and are consequently extremely heavy so that it is necessary that the belts are assembled at the conveyor installation site with completed belt sections each consisting of a cured rubber-like belt material in which the embedded tendon members are provided. It has been the previous practice to fabricate the belt sections in a factory or other manufacturing facility from which the cured ready-to-use belt sections are transported to the assembly site and spliced together in end-to-end manner until the complete belt loop formed of the discrete sections is fabricated. The great weight of the conveyor belt material limits the length of each belt section and creates substantial problems of transportation particularly where the belt is to be assembled in remote areas.

Another problem of prior known conveyor belt constructions arises by virtue of the fact that the belts have been previously driven by large motors at each end of the belt with these motors sometimes being as high as 2,000 horsepower and consequently being extremely expensive. Moreover, the long distances between drive input locations require that the belt be extremely strong in order to absorb the tension necessary to effect movement of the entire belt. Consequently, such systems have been limited in maximum length to approximately 30,000 feet and have been extremely expensive to fabricate and maintain. In an effort to solve the foregoing problems, B. F. Goodrich Engineer Systems Co. devised a lighter weight belt construction employing embedded reinforcing cables extending inwardly from each edge of the belt with the belt being supported and driven by a large number of relatively low powered drive units positioned at relatively short intervals along the length of the belt and engaging the belt at each edge by means of driven radial automobile type tires; such a system is discussed and described in the Nov. 2, 1974 issue of Business Week. The Goodrich system makes it possible to construct belts of any desired length since the application of the driving force to the belts at spaced intervals along the length of the belts eliminates the need for the extremely high strength necessary for carrying the driving force in long belts in the manner of the previous conveyor systems.

In the assembly of the Goodrich system, the completely fabricated and vulcanized belt sections are transported to the site and are spliced together in the same manner as the previous belt designs. The particular splicing process is similar to that disclosed in U.S. Pat. No. 3,481,807 in which the end cable members are stripped and interleaved together with the rubber body portion of the belt then being rebuilt over the unconnected cable members. The entire strength of such a splice is dependent upon the resistance to shear of the portions of the rubber-like body member between the cable ends in the spliced area since there is no mechanical connection between the cables per se. A very substantial disadvantage of a splice of the foregoing type is that the spliced section in which the cable ends are interleaved is of substantially greater rigidity than are other portions of the belt. Consequently, the passage of the belt around supporting rollers or the like subjects the belt portions immediately adjacent the interleaved cable portions to substantial bending forces resulting from a greater resistance to bending of the relatively rigid splice section which contains twice as many cables resisting the bending than are contained in the remaining portions of the belt. Conveyor belts formed in the foregoing manner are consequently prone to failure in the belt areas immediately adjacent the splice section.

While the Goodrich type belt is substantially lighter than comparable prior belts, it is still quite heavy and the transportation of an assembled belt component to the installation site can be relatively difficult and expensive.

Another problem found in all types of reinforced belt conveyors employing bare cable members embedded in the body of the belt is that the cable members are subject to corrosion and resultant failure when the body of the belt is cut or cracked to permit the entry of corrosive materials. Only a small amount of corrosive material is necessary in many instances to result in failure of the cable. Since the rubber-like body member of most conveyor belts must be relatively flexible, it cannot be made sufficiently hard or rigid in order to resist the damage of the type which will permit the entry of corrosive material into the body of the belt to contact the cable members.

Yet another problem of currently known reinforced conveyor belts is that the cable members cannot be lubricated to reduce the friction and heat generation from relative movement of the wires due to the fact that the presence of lubrication on the cable would have a deleterious effect on the rubber body members of the belt during the vulcanization process when the body member is formed over the cable. Additionally, any lubricant on the cable member itself will prevent the bonding of the rubber-like material to the cable member and it is consequently necessary that such cables as used in rubber-like body members be absolutely dry and free of lubricant during the application of the rubber-like material to the surface of the cables.

Therefore, it is the primary object of this invention to provide a new and improved method of fabricating conveyor belts.

Yet another object of the invention is the provision of a new and improved method of assemblying conveyor belt components.

Another object of the invention is the provision of a new and improved conveyor belt construction.

Achievement of the foregoing objects of the invention is enabled by the fabrication of a unique conveyor belt in a unique manner for use in conjunction with modular drive units of the type proposed by B. F. Goodrich Engineer Systems Co. as discussed previously in which the belt is driven by a plurality of relatively small modular drive units employing radial tires for engaging the opposite edges of the belt for effecting the belt movement. The preferred embodiment of the inventive belt differs from that of the Goodrich system in that it does not contain any single area in which all of the cables are spliced together. The foregoing construction is effected by having only a single cable splice junction at any particular location along the length of the belt. The cable splices are spaced at uniform discrete intervals with only a single cable splice being positioned at any cable splice junction so that the belt is of uniform flexibility along substantially its entire length. Moreover, the cable members are coated with a plastic jacket protecting the cable from corrosion and which also enables the cable to contain a coating of lubricant in a conventional manner for lessening internal cable friction with the plastic jacket preventing contact of the lubricant with the rubber-like body of the belt.

The foregoing belt construction is enabled by a unique fabrication method in which the uncured rubber components of the belt are brought to the installation site on reels. The uncured rubber-like material is supported in an upper roll and a lower roll which rolls are unwound together with the upper web being in aligned abutting relationship with the lower web with each extending in a horizontal plane. The reinforcing cables are also supported on reel means and are concurrently unwound from the reel members into position between the webs of unvulcanized rubber-like material to extend along areas adjacent each edge of the unvulcanized webs. Consequently, a sandwich array consisting of an upper web and a lower web of uncured rubber-like material and cable members therebetween is fed forwardly from the supply reels for the web and cable components into vulcanizing means. The cable reels are adjusted for back tension so all of the cables entering between the sandwich of uncured rubber-like material are under equal tension. The feed of the components is terminated and the vulcanizing means is operated for a predetermined time period of approximately 30 minutes during which time the upper and lower webs are vulcanized together with the cables embedded in place so as to provide a unitary conveyor section of a discrete length. A substantial savings in total belt fabrication and assembly time is achieved by fabricating the belt continuously so that there is no delay of 8—12 hours to splice all of the cables at one time as in the old methods, but rather only one single cable splice at the predetermined interval. Cable lengths on the supply reels of 10,000 to 30,000 feet are pre-positioned so that only one cable end has to be spliced at approximately 3000 foot intervals during the belt manufacture. The splicing of the trailing and leading cable ends is effected during the time that the vulcanizing means is being operated so that no additional time is required for effecting the cable splicing function. Consequently, the total fabrication and assembly time for the conveyor is greatly reduced as compared to the previous methods in which the cured conveyor belt sections were assembled in the factory and transported to the site with all of the cable splices at the junctions of the belt sections being effected in a time consuming process during which no other fabrication procedures are possible. In other words, the belt section fabrication and vulcanization is achieved at the same time rather than at different times as is presently the case with other forming and assembly methods.

A more complete understanding of the manner in which the preferred embodiment achieves the foregoing objects will be obtained when the following written description is considered in conjunction with the appended drawings in which:

FIG. 1 is a side elevation of the preferred embodiment for practice of the invention;

FIG. 2 is a top plan view of the preferred embodiment;

FIG. 3 is a bisecting sectional view of the inventive conveyor belt formed by the inventive method;

Figure 4:
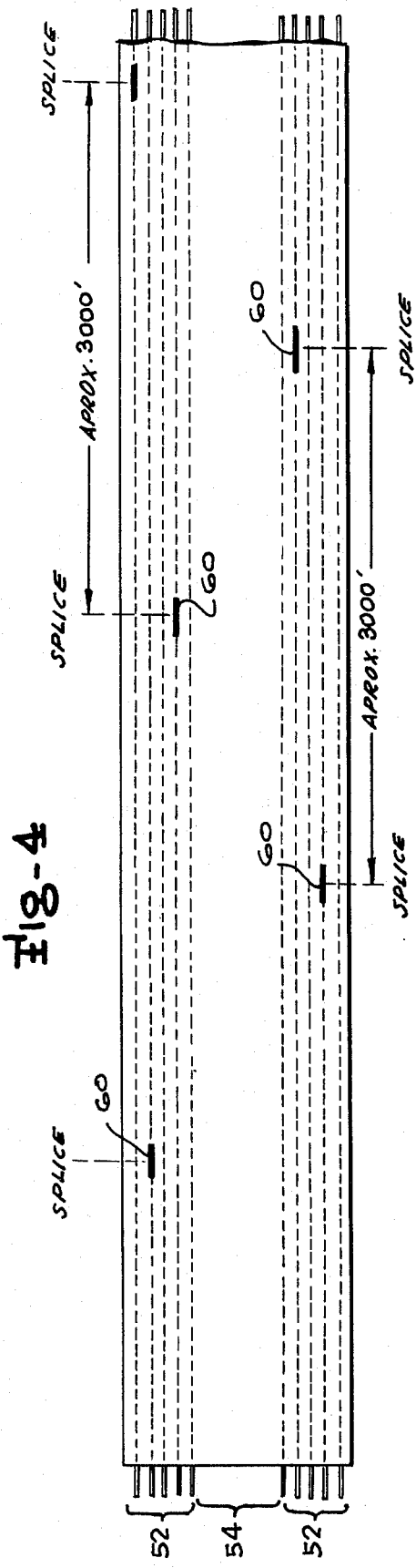
FIG. 4 is a top plan view of a section of the inventive conveyor belt illustrating the staggered manner in which the cable splice junctions are positioned.

Attention is initially invited to FIG. 1 of the drawings which illustrates the necessary components for practice of the subject invention including a table-like support means 8 on which is provided cable supply means 10 which consists of two vertically extending pillars (or equivalent supporting frames) 12 on which a plurality of reel supporting shafts 14 with an appropriate back tension device, are mounted. Each shaft 14 supports a cable reel 16 for rotation for enabling the feeding of reinforcing cables 18 into a conveyor component assembly station generally designated 20. In addition, a cable splicing machine 22 of the type disclosed in U.S. Pat. No. 3,754,845 is movably supported on support means 8 and is used for splicing the trailing end of a cable leaving an empty reel to the next succeeding cable so as to provide a continuous cable member which is in the form of a loop in the finished conveyor belt loop.

Cable members 18 fed from the cable supply means 10 are directed by appropriate guide means 24 etc. into the conveyor assembly station 20 which consists of vertically extending frame members 26 and horizontal frame members 28 that are interconnected to provide support for an upper roll 30 of raw rubber and a lower roll 32 of raw uncured rubber-like material which are supported for rotation on standards 34 and 36 respectively having cradle bearings 39 and 41 in which supporting shafts 38 and 40 of the upper and lower rolls are achieved. The upper and lower rolls can be supported on vertically adjustable supports if desired.

The upper and lower webs are formed of conventional uncured rubber or the like as previously used for forming conveyor belts with the specific material used depending on the nature of the particular installation. In any event, the rolls are rotated in the direction of arrows 42 as shown in FIG. 1 so that uncured raw rubber webs 30' and 32' are respectively fed from the rolls 30 and 32 and receive the reinforcing cable tendons 18 between their abutting facing surfaces to provide a sandwich array 43 of unbonded conveyor components consisting of the webs 30' and 32' and the reinforcing cable tendons 18. The sandwich array 43 is fed to the left between guide rollers 42 and 44 into a conventional pressure and heat applying vulcanizing unit 50. Heat and pressure are applied to the sandwich array of conveyor belt components in the vulcanizing unit 50 in a conventional manner for a given time period depending upon the size and nature of the materials which results in a curing of the rubber web members and a permanent bonding of the web members and cable members together to form a unitary conveyor belt section of the same length as the vulcanizing unit.

It will be noted from inspection of FIGS. 2 through 4 that the reinforcing cables 18 are provided in areas 52 extending inwardly from the side edges of the conveyor belt without any cables being provided in the center portion 54 of the belt. The positioning of the reinforcing cables only in the edge portions of a flexible rubber conveyor belt has been employed in conveyor systems developed by B. F. Goodrich Engineer Systems Co. in which the edge portions of the belt are engaged by radial tires positioned at intervals along the belt and driven by relatively small motors for effecting belt movement as noticed previously as being described at some length in the Nov. 2, 1974 issue of Business Week Magazine. The present invention differs from that of the Goodrich system in employing cable splices of the reinforcing cables staggered at uniform intervals along the length of the belt with only one cable splice occurring at any given splice location along the belt so that the belt does not have any splice areas in which all of the cables are spliced together to result in a more rigid belt section than remaining components of the belt.

In addition, the subject inventive method effects the splicing of the cables during the time that the sandwich array is being cured by the vulcanizing unit 50. Consequently, there is a substantial savings in time in the fabrication of the complete belt as well as substantial functional advantages achieved by virtue of the elimination of the multi-cable splice section as previously employed.

Completion of the vulcanization of the sandwich array positioned in the vulcanizing means provides a first cured section of belt of a length equal that of the vulcanizing means which is then fed forwardly from the vulcanizing means while a second sandwich array is fed into the vulcanizing means which is again activated to provide a second section of cured belt extending contiguously from the first section of uncured belt. The cycle is repeated with different ones of the cables 18 being spliced to provide splice junctions 60 at desired intervals so that the splice junctions of the different cable tendons are equidistantly positioned along the length of the belt as best illustrated in FIG. 4. It should be noted that the splice junctions 50 of the different cable members are not aligned with or in the same area as any of the other splice junctions so that the belt is essentially of uniform flexibility along its entire length. The splicing apparatus 22 is mounted on movable dolly or rail means in order that it may be conveniently positioned on the table 8 for effecting the splicing of the different cable members as the fabrication procedure continues. It should be understood that in most instances a splicing operation will not be necessary during each vulcanizing operation with splicing being normally accomplished during every third or fourth vulcanizing operation. However, splicing of one of the tendons during each vulcanizing step would be necessary if a large number of cables are employed.

In the example of FIG. 4, the adjacent splices in the same edge portion 52 of the conveyor belt are approximately 3000 feet apart while the next adjacent splices on opposite sides of the belt are approximately 1500 feet apart. The spacing of the splice junctions depends upon the number of the reinforcing cables employed in the particular belt with the distance between adjacent splices being easily determinable by simple mathematics.

Figure 5:
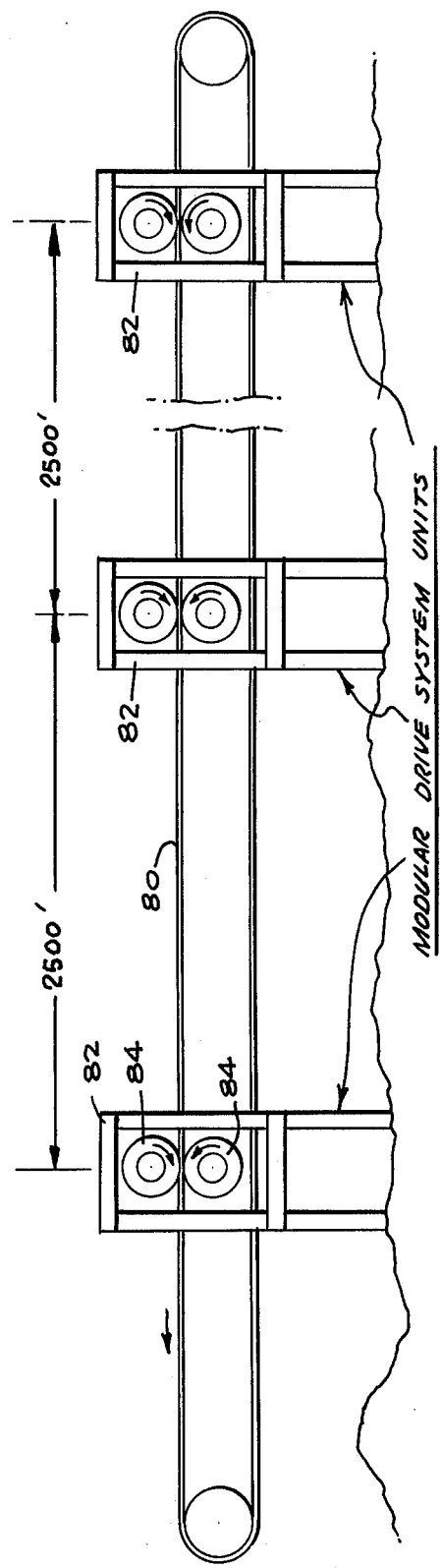
FIG. 5 is a side elevation view of a typical conveyor installation employing the inventive belt fabricated by the inventive method.

The splicing procedure is continued until a complete belt 80 is formed as shown in FIG. 5 with a plurality of modular drive units 82 each having radial tires 84 being provided to engage and drive the belt in the manner described in the aforementioned Business Week article. As shown in FIG. 5, the spacing of the modular drive units can be approximately 2500 feet with the actual spacing varying in accordance with the particular installation as determined by the load requirements, speed, geometry, of the system and the like. Other drive systems can be employed if desired.

The wires of cable tendons 18 are lubricated and the cables are preferably provided with a pressure extruded plastic jacket of polyester elastomer sold under the trademark HYTREL by E. I. DuPont de Nemours and Company of Wilmington, Delaware with the same jacketing material being applied to the splice junction by means 22. The plastic jacketing on the cables must be cleaned and the clean jacket is provided with a coating of commercial primer sold under the trademark CHEMLOK 402 made by Hughson Chemicals, a division of Lord Corp. of Erie, Pa. The coated cables are then positioned between the uncured raw rubber webs 30' and 32' and then moved into the vulcanizing unit. It is also possible to use dry unlubricated and unjacketed cables if desired; in such instances the splice junctions would still be jacketed by means 22 in order to provide a splice of maximum strength. The details of the splice are also illustrated in abandoned U. S. patent application Ser. No. 454,998 filed Mar. 27, 1974 to which reference is made.

The first group of cables used in the initial fabrication steps of forming the belt will all be of different lengths in order to provide the staggered positioning of the splice junctions along the length of the belt with subsequent cable sections then being of equal length. Alternatively, the leading ends of the cables could be drawn fowardly through the vulcanizing means for different distances prior to the first operation of the vulcanizing means so as to achieve the desired equidistant spacing of the cable ends and splice junctions in the elongated cable section.

Therefore, it will be appreciated that the subject invention provides a unique method of fabricating a continuous conveyor belt portion having reinforced cable tendons with the belt portion being of any desired length even extending for many miles if desired. Moreover, the belt portion employs cable splice junctions at uniformly spaced discrete intervals along its length so that the entire length of the belt portion is of unifom nature with the possible exception of the area in which the forward end of the first formed belt section 56 is connected to the trailing end of the last-formed belt section in the final fabrication step to provide the complete belt loop. However, it will be appreciated that the last splice junctions in this part of the belt can be positioned so that no two splice junctions are in alignment at any particular transverse location in this area.

The fact that the sub-component cables and uncured rubber webs are transported to the assembly site as opposed to transporting of finished belt sections as previously done provides substantial advantages in handling due to the lesser weight of the uncured rubber webs and cables as compared to the heavy and cumbersome finished belt sections.

It should be understood that numerous modifications of the subject inventive method and belt construction will undoubtedly occur to those of skill in the art and the spirit and scope of the invention is to be limited solely by the appended claims.

I claim:

1. A method of fabricating a conveyor belt having continuous loops of reinforcing cable embedded in a loop of rubber material comprising the steps of:
   a. feeding first and second elongated webs of raw rubber from first and second web supply means into facing abutting relationship;
   b. concurrently feeding a plurality of parallel cable members equal to the desired number of continuous loops of reinforcing cable to and between said first and second webs of raw rubber to provide an unbonded sandwich array in which said cable members extend between said webs substantially parallel to the axes of said webs;
   c. guiding a predetermined length of said sandwich array into vulcanizing means and subsequently activating said vulcanizing means for a given time period to effect curing and bonding of said first and second webs of predetermined length of said sandwich array to provide a section of unitary cable reinforced belt; and
   d. concurrently effecting the spliced junction of the trailing end of selected ones of said cable members to the forward end of a next succeeding cable during selected ones of said given time periods while said vulcanizing means is activated so that the cable splices are spaced apart longitudinally along the length of the belt from the next adjacent splice on any of the other cables by a length substantially in excess of said predetermined length.

2. The method of claim 1 wherein said first and second webs are positioned with said first web in overlying relationship to said second web and resting thereon.

3. The method of claim 2 wherein said cable members are fed between said first and second web members in first and second cable receiving areas extending inwardly from opposite edges of said web members with no cable members being fed to the central portion of the sandwich array.

4. The method of claim 3 wherein said cable members are provided with a jacket consisting of a coating of plastic material and including the additional step of applying a primer coating to said jacket prior to the positioning of the cable members between the web members for enhancing the bonding of the web members to the jackets of said cable members.

5. The method of claim 4 wherein said splicing of the trailing end of each of said cable members to the forward end of a next succeeding cable member is accomplished by initially effecting a strand interleaved type splice to provide an interleaved cable splice section followed by enclosing said cable splice section in a flexible jacket formed of plastic material while holding said splice section in tension.

6. A method of making a conveyor belt portion having a body member of rubber-like material in which reinforcing cable members are embedded, said method comprising the steps of positioning portions of first and second elongated webs of uncured rubber in facing stacked abutting relationship, positioning a plurality of parallel cable members between said first and second webs of uncured rubber to provide a first unbonded sandwich array portion in which said cable members are under equal tension and extend between said webs substantially parallel to the longitudinal axes of said web, positioning said first sandwich array portion in vulcanizing means, concurrently positioning second portions of said first and second elongated webs and cable members to provide a second unbonded sandwich array portion, activating said vulcanizing means for a given time period to effect curing and bonding of said first and second webs in said firt sandwich array portion to provide a first cured section of unitary reinforced belt, removing said first cured section of unitary reinforced belt from said vulcanizing means while concurrently moving said second sandwich array portion into said vulcanizing means and forming a third unbonded sandwich array portion, activating said vulcanizing means for a given time period to effect curing and bonding of said first and second webs in said second sandwich array portion to provide a second cured section of unitary reinforced belt contiguously extending from said first cured section of unitary reinforced belt from said vulcanizing means, forming additional contiguous belt sections of cured sections of unitary reinforced belts in the foregoing manner and concurrently effecting the spliced junction of successively different ones of said cable members during selected ones of said time periods when said vulcanizing means is activated to provide a cured belt portion in which the splice junctions of said cable members are substantially equidistantly spaced from the next adjacent splice junction along the length of said conveyor belt portion with said spliced junctions being uniformly spaced along said length to provide a maximum possible longitudinal spacing along the length of said belt portion between the splice junctions of the different cable members.

7. The invention of claim 6 wherein said cable members are plastic jacketed lubricated wire cables.

8. The method of claim 6 wherein said cable members are positioned between said first and second web members solely in first and second cable receiving areas extending inwardly from opposite edges of said web members.

9. The method of claim 8 wherein said cable members are provided with jackets of plastic material and including the additional step of applying primer to said jackets prior to the positioning of the cable members between the web members for enhacing the bonding of the web members to the jackets of said cable members.

10. The method of claim 6 wherein said splicing is accomplished by initially effecting a strand interleaved type splice to provide an interleaved cable splice section followed by enclosing of said interleaved cable splice section in a flexible jacket formed of plastic material.

11. The invention of claim 10 wherein said cable members are plastic jacketed lubricated wire cables.

* * * * *